![United States Patent Office]

2,915,506
Patented Dec. 1, 1959

2,915,506

TRIFLUOROCHLOROETHYLENE INTERPOLYMERS

Francis J. Honn, Westfield, N.J., and John M. Hoyt, Woodside, N.Y., assignors, by mesne assignments, to Minnesota Mining and Manufacturing Company, St. Paul, Minn., a corporation of Delaware No Drawing. Application February 2, 1956
Serial No. 562,924

4 Claims. (Cl. 260—80.5)

This invention relates to halogen-containing polymeric compositions, and more particularly to trifluorochloroethylene interpolymers. The invention has as an object new and useful compositions of matter. Another object of the invention is valuable interpolymeric compositions comprising trifluorochloroethylene. A still further object of the invention, resides in a process for obtaining these interpolymeric compositions in good yields. Other objects and advantages inherent in the invention will become apparent to those skilled in the art from the accompanying description and disclosure.

In accordance with the present invention the interpolymeric compositions are produced by interpolymerizing trifluorochloroethylene, vinylidene fluoride and vinyl chloride, under the conditions as more fully hereinafter described. The interpolymers thus produced are valuable macromolecules and are adaptable to a wide variety of commercial uses. They are chemically and thermally stable, resistant to oil and hydrocarbon-fuels, selectively soluble in various commercial solvents and can be molded by conventional techniques to yield a wide variety of useful articles. They also serve as durable, flexible, protective coatings on surfaces which are subjected to environmental conditions in which they may come into contact with various corrosive substances such as oils, fuels and strong chemical reagents.

The interpolymers of the present invention are produced from monomeric mixtures comprising trifluorochloroethylene, vinylidene fluoride and vinyl chloride in which each of the monomeric components is present in an amount of at least 1 mole percent. The most useful interpolymers are produced from monomeric mixtures comprising trifluorochloroethylene, vinylidene fluoride and vinyl chloride in which each of the monomeric components is present in an amount between about 5 mole percent and about 90 mole percent. Within this range interpolymers are preferred which are produced from monomeric mixtures comprising trifluorochloroethylene, vinylidene fluoride and vinyl chloride in which each of the monomeric components is present in an amount of between about 20 mole percent and about 60 mole percent.

The interpolymers of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe system is preferred.

The water-suspension type system contains a water-soluble peroxy type initiator which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt, such as ferrous sulfate or ferrous nitrate to accelerate the polymerization. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also preferred, in these water-suspension type recipe systems, that a reductant be present, which is preferably in the form of a bisulfite, such as sodium bisulfite, potassium bisulfite, sodium metabisulfite, or potassium metabisulfite. The reductant, for example, sodium metabisulfite, comprises between about 0.05 and about 5 parts by weight per 100 parts of total monomers present; preferably the reductant comprises between about 0.1 and about 2 parts by weight per 100 parts of total monomers present. It has also been found that the presence of such materials as borax, is beneficial in these water-suspension type recipe systems in aiding in the maintenance of optimum pH conditions.

In some instances, it is desirable to employ an emulsifying agent in the aforementioned water-suspension type recipe systems. This emulsifying agent is preferably employed in the form of a halogenated organic acid or the metallic salt of a halogenated organic acid, having from 6 to 18 carbon atoms per molecule. Typical examples of the halogenated organic acids or salts thereof serving as emulsifying agents in the above-mentioned recipes are polyfluorocarboxylic acids (e.g., perfluorooctanoic acid) or perfluorochlorocarboxylic acid salts (e.g., trifluorochloroethylene telomer acid soaps). The perfluorocarboxylic acids which may be employed are such as those disclosed in U.S. Patent No. 2,559,752; and the non-acidic derivatives of the acids disclosed therein as being effective dispersing agents in polymerization reactions may also be used in the process of the present invention. The perfluorochlorocarboxylic acid salts which may be used in accordance with this invention are those disclosed in co-pending application S.N. 501,782, filed April 18, 1955, as being useful dispersing agents in polymerization reactions. In general, these emulsifying agents comprise between about 0.5 and about 10 parts by weight per 100 parts of total monomers present.

The polymerization reaction is preferably conducted under alkaline conditions. It is desirable that the pH be maintained between about 7 and 11 in order to prevent gelling of the resulting latex, a condition which often causes slow-down or stoppage of the polymerization reaction. In this respect, it should be noted that it is sometimes necessary to maintain the pH of the system within the aforementioned pH limits by the addition of suitable buffer agents.

As indicated above, the polymerization reaction may also be carried out with the initiator being present in the form of an organic peroxide in a bulk-type polymerization system. Of these organic peroxide promoters, halogen-substituted peroxides are preferably employed. A preferred promoter of this type is trichloroacetyl peroxide. Other halogen-substituted organic peroxides which are suitable for carrying out the polymerization reaction are trifluorochloropropionyl peroxide, trifluoroacetyl peroxide, difluoroacetyl peroxide, chloroacetyl peroxide, 2,4-dichlorobenzoyl peroxide and dichlorofluoroacetyl peroxide.

The polymerization reaction is carried out, in general, at a temperature between about $-30°$ C. and about $150°$ C. When the polymerization reaction is carried out in the presence of an aqueous-suspension type recipe, temperatures between about $0°$ C. and about $75°$ C. are preferably employed. When the polymerization reaction is carried out in the presence of an organic peroxide initiator in a bulk-type polymerization system, temperatures between about $-20°$ C. and about $20°$ C. are preferably employed. The polymerization reactions described herein to produce the interpolymers of the present invention are carried out under autogenous conditions of pressure. In general, these pressures may vary from about atmospheric pressure to as high as approximately 2000 pounds per square inch.

As previously indicated, the interpolymers of the present invention are particularly suitable and useful for the fabrication of a wide variety of materials having highly desirable physical and chemical properties. In this respect, the interpolymers of the present invention possess important utility in the fabrication of resilient gaskets, seals, valve-diaphragms, films and various other commercial applications. Another important use of the interpolymers of the present invention is in the form of durable, flexible, protective coatings on surfaces which are subjected to distortion in normal use, e.g., fabric surfaces. For these purposes, the interpolymers of the present invention may be dissolved in various commercial solvents. Particularly useful solvents comprise aliphatic and aromatic esters, ketones and halogenated hydrocarbons. Typical examples of these solvents are methyl ethyl ketone, methyl isobutyl ketone, di-isobutyl ketone, ethyl acetate and 1,1,2-trifluorotrichloroethane. In this respect, it should be noted that it is often desirable to regulate the molecular weight of the interpolymers of the present invention in order to obtain greater solubility in organic solvents. It is also important to vary the softness of the interpolymer for easier processibility in molding operations. It is found that the addition of various polymerization modifiers appreciably reduces the molecular weight of the interpolymers and increases their solubility and ease of processibility without affecting unduly the yield of interpolymers. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. These modifiers are preferably added in amounts of about 0.01 and about 10 parts by weight per 100 parts of total monomers charged to the polymerization reaction. Chloroform is preferred.

The following examples are offered for a better understanding of the present invention in producing interpolymers of trifluorochloroethylene, vinylidene fluoride and vinyl chloride, and are not to be construed as limiting in scope.

*Example I*

A heavy-walled glass polymerization tube was flushed with nitrogen and then charged with 6 ml. of deionized water and 1 ml. of an aqueous solution containing 2.0 grams of sodium metabisulfite in 100 ml. of solution. The contents of the tube were then frozen, and the tube was next charged with 2 ml. of an aqueous solution containing 2.5 grams of ammonium persulfate dissolved in 100 ml. of water. The contents of the tube were next refrozen, and the tube was then charged with 1 ml. of an aqueous solution containing 0.5 gram of $FeSO_4 \cdot 7H_2O$ in 100 ml. of solution. The tube was next connected to a vacuum-transfer system and evacuated at liquid nitrogen temperature. To the frozen contents of the tube were added, by distillation, 2.75 grams of trifluorochloroethylene, 1.51 grams of vinylidene fluoride and 0.74 gram of vinyl chloride, to make-up a total monomer charge containing 40 mole percent trifluorochloroethylene, 40 mole percent vinylidene fluoride and 20 mole percent vinyl chloride.

The polymerization tube was then sealed and rotated end-over-end in a temperature-regulated water-bath at approximately 20° C. for a period of 24 hours. At the end of this time, the contents of the tube were coagulated by freezing at liquid nitrogen temperature. The coagulated product was then collected, washed with hot water and dried to constant weight in vacuo at 35° C. An interpolymeric product of trifluorochloroethylene, vinylidene fluoride and vinyl chloride was obtained in an amount corresponding to a 23% conversion.

*Example II*

Employing the procedure set forth in Example I and ten times the quantity of the same polymerization recipe, a stainless-steel reaction vessel was charged with 31.2 grams trifluorochloroethylene, 17.1 grams vinylidene fluoride and 1.70 grams of vinyl chloride to make-up a total monomer charge containing 47.5 mole percent trifluorochloroethylene, 47.5 mole percent vinylidene fluoride and 5.0 mole percent of vinyl chloride.

The polymerization reaction was carried out at a temperature of approximately 20° C. for a period of 2 hours. The resulting polymerization product was worked-up in accordance with the same procedure as set forth in Example I. An interpolymeric product of trifluorochloroethylene, vinylidene fluoride and vinyl chloride was obtained in an amount corresponding to a 6.5% conversion.

As previously indicated, the interpolymeric compositions of the present invention possess highly desirable chemical and physical properties which make them useful for the fabrication of a wide variety of articles or for application to various surfaces as protective coatings. In such uses, the raw interpolymeric composition (such as is produced in accordance with the procedures set forth in Examples I and II above) can be extruded or pressed into sheets at temperatures between about 200° F. and about 650° F. and at a pressure between about 500 and about 15,000 pounds per square inch, for a period of about 1 minute to about 10 minutes. Thereafter, various articles can be molded from preforms cut from sheets or extruded stock in the form of gaskets, diaphragms, etc. In this respect, it should also be noted that the raw interpolymer may be combined with various vulcanizing agents and fillers, if so desired. The presence of vinyl chloride in the finished interpolymer facilitates the ease of cross-linking or vulcanization to a degree not otherwise obtainable if only the copolymer of trifluorochloroethylene and vinylidene fluoride were to be processed.

When employed as protective coatings on any of the surfaces previously described, the raw interpolymeric composition is dissolved in any of the aforementioned solvents, and is applied to the desired surfaces, employing such apparatus as a knife-spreader, or a doctor-blade or a reverse-roll coater. The solvent, after the interpolymeric coating composition has been applied to the surface, is permitted to evaporate. This may also be accomplished in the presence of elevated temperatures. In many applications, it is desirable to include, in the interpolymeric coating composition, various vulcanizing agents, in which case supplementary heat-treatment of the coating is required either during the solvent removal step, or thereafter. After the solvent has been completely evaporated and after the vulcanization step, if included, has been completed, the coated surface is ready for use. It should also be noted that the interpolymeric coating composition may be applied to the surface either as a single coating, or, if so desired, the protective coating may be built-up by the application of several layers, each layer being permittted to harden by solvent evaporation before the next layer is applied. Furthermore, if so desired, the protective coatings or the interpolymer compositions when obtained in the form of sheets may be suitably pigmented. Other uses for the interpolymeric compositions of the present invention reside in the fabrication of adhesives for fastening a rubber surface to a metal or another rubber surface, or as electrical insulators, and various uses as a dielectric medium.

Since certain changes may be made in carrying out the process of the present invention in producing the desired interpolymeric compositions without departing from the scope of the invention, it is intended that all matter contained in the above description is to be interpreted as illustrative and not in a limiting sense.

We claim:

1. A process for preparing an readily vulcanizable interpolymer which comprises polymerizing in contact with a free radical forming polymerization promoter at a temperature between −30° C. and about 150° C. a monomeric mixture of trifluorochloroethylene, vinylidene fluoride and vinyl chloride, in which each of trifluorochloroethylene and vinylidene fluoride is present in an amount between about 20 and about 60 mol percent and in which the vinyl chloride is present in an amount between about 1 and about 20 mol percent.

2. A process for preparing an readily vulcanizable interpolymer which comprises polymerizing in contact with between about 0.1 and about 5 parts by weight per 100 parts of total monomers of an inorganic peroxy compound at a temperature between about 0° C. and about 75° C. a monomeric mixture of trifluorochloroethylene, vinylidene fluoride and vinyl chloride, in which each of tirfluorochloroethylene and vinylidene fluoride is present in an amount between about 20 and about 60 mol percent and in which the vinyl chloride is present in an amount between about 1 and about 20 mol percent.

3. A process for preparing an readily vulcanizable interpolymer which comprises polymerizing in contact with an organic peroxy compound at a temperature between about −20° C. and about 20° C. a monomeric mixture of trifluorochloroethylene, vinylidene fluoride and vinyl chloride, in which each of trifluorochloroethylene and vinylidene fluoride is present in an amount between about 20 and about 60 mol percent and in which the vinyl chloride is present in an amount between about 1 and about 20 mol percent.

4. An readily vulcanizable interpolymer of a monomeric mixture consisting essentially of trifluorochloroethylene, vinylidene fluoride and vinyl chloride, in which each of trifluorochloroethylene and vinylidene fluoride is present in an amount between about 20 and about 60 mol percent and in which the vinyl chloride is present in an amount between about 1 and about 20 mol percent.

References Cited in the file of this patent

UNITED STATES PATENTS

| | | |
|---|---|---|
| 2,468,054 | Ford | Apr. 26, 1949 |
| 2,479,367 | Joyce et al. | Aug. 16, 1949 |
| 2,751,376 | Barnhart et al. | June 19, 1956 |

FOREIGN PATENTS

| | | |
|---|---|---|
| 589,577 | Great Britain | June 24, 1947 |
| 608,807 | Great Britain | Sept. 21, 1948 |